United States Patent [19]
Hamilton

[11] Patent Number: 5,839,398
[45] Date of Patent: Nov. 24, 1998

[54] POWER STEERING FLUID TEMPERATURE CONTROL

[75] Inventor: Robert A. Hamilton, Rochester, Mich.

[73] Assignee: TRW Inc., Lyndhurst, Ohio

[21] Appl. No.: 956,573

[22] Filed: Oct. 23, 1997

[51] Int. Cl.$^6$ .................................................. F28D 7/10
[52] U.S. Cl. ........................................................ 123/41.33
[58] Field of Search .............................. 123/41.01, 41.3, 123/41.33

[56] References Cited

U.S. PATENT DOCUMENTS

| | | | |
|---|---|---|---|
| 2,399,941 | 5/1946 | Resek | 123/41.33 |
| 4,478,178 | 10/1984 | Pernet | 123/41.01 |
| 4,545,335 | 10/1985 | Hayashi | 123/41.27 |
| 4,722,305 | 2/1988 | Haskell | 123/41.27 |
| 4,896,718 | 1/1990 | Trin | 123/41.33 |
| 4,923,001 | 5/1990 | Marcolin | 123/41.33 |
| 5,067,561 | 11/1991 | Joshi et al. | 123/41.33 |
| 5,513,490 | 5/1996 | Howell et al. | 60/327 |

FOREIGN PATENT DOCUMENTS

| | | | |
|---|---|---|---|
| 3-271518 | 12/1991 | Japan | 123/41.33 |

*Primary Examiner*—David A. Okonsky
*Attorney, Agent, or Firm*—Tarolli, Sundheim, Covell, Tummino & Szabo

[57] ABSTRACT

An engine cooling system (16) of a vehicle (12) includes a coolant de-gas bottle (30) which contains a body of liquid engine coolant (52). The vehicle (12) also has a second fluid system such as a fluid power assist steering system (70) or an engine lubricating oil system. The de-gas bottle (30) includes means for defining a second fluid passage (82) in the de-gas bottle for enabling flow of the second fluid through the de-gas bottle in a heat-exchanging relationship with the body of liquid engine coolant (52) in the de-gas bottle.

10 Claims, 1 Drawing Sheet

POWER STEERING FLUID TEMPERATURE CONTROL

BACKGROUND OF THE INVENTION

1. Technical Field

The present invention relates to a fluid temperature control system for a vehicle. In particular, the present invention relates to an apparatus for maintaining a vehicle fluid, such as power steering fluid or engine lubricating oil, at a desired temperature.

2. Description of the Prior Art

Many vehicles have a power assist steering system which uses power steering fluid to effect steering movement of steerable wheels of the vehicle. The power steering fluid circulates through conduits which are exposed to heat in the vehicle engine compartment. The power steering fluid also becomes heated in performing steering work. Over heated power steering fluid tends to break down and oxidize, leaving deposits on metal surfaces. The life of power steering fluid can be extended, and the performance of the power assist steering system can be better maintained, if the fluid is kept relatively cool.

One known type of cooler for power steering fluid is a small radiator, that is, a liquid to air heat exchanger, located adjacent to the vehicle radiator. Another known type of cooler is an extra length of metal tubing which extends through the vehicle engine compartment and through which the fluid flows. This cooler, also, is a liquid to air heat exchanger.

SUMMARY OF THE INVENTION

The present invention is an engine coolant de-gas bottle for use in the engine cooling system of a vehicle. The vehicle also has a second fluid system such as a fluid power assist steering system or an engine lubricating oil system. The engine coolant de-gas bottle comprises means for containing a body of engine coolant in the de-gas bottle. The engine coolant de-gas bottle also comprises means for defining a second fluid passage in the de-gas bottle for enabling flow of the second fluid through the de-gas bottle in a heat-exchanging relationship with the body of engine coolant in the de-gas bottle.

In one embodiment, the second fluid system is a fluid power assist steering system and the second fluid is power steering fluid. In another embodiment, the second fluid system is an engine lubricating oil system and the second fluid is engine lubricating oil.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
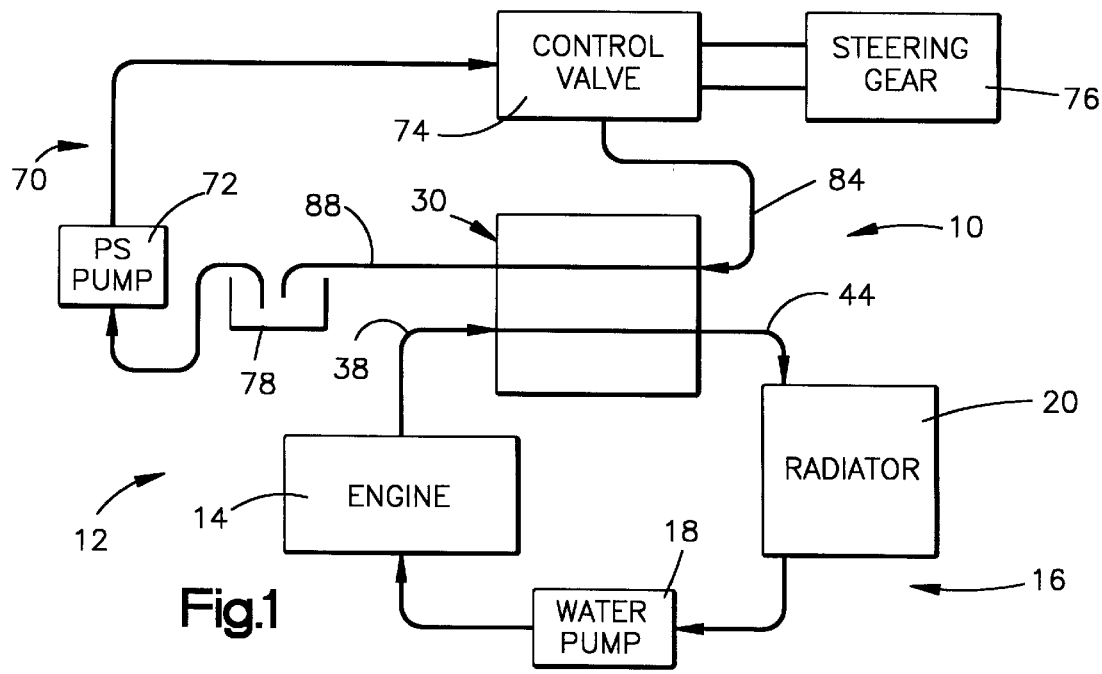
FIG. 1 is a schematic block diagram of a fluid cooling system in accordance with the present invention, for cooling power steering fluid of a vehicle.
Figure 2:
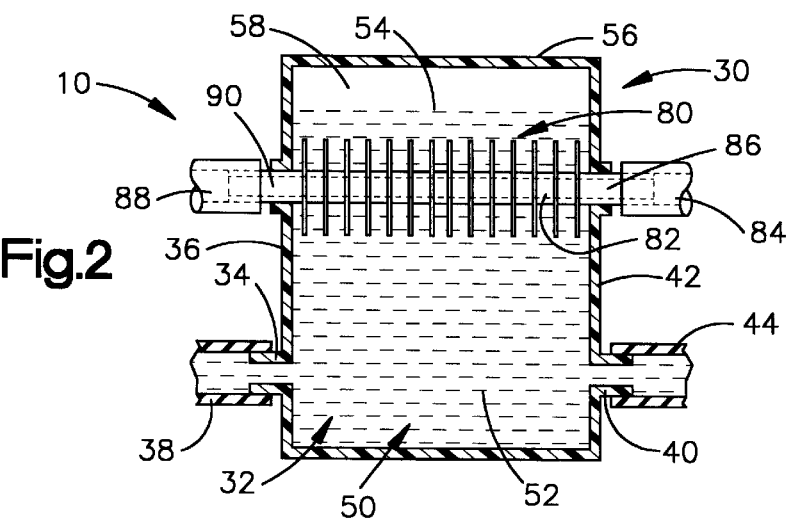
FIG. 2 is a schematic illustration of a coolant de-gas bottle which forms a part of the cooling system of FIG. 1.

The present invention relates to a fluid temperature control system for a vehicle. In particular, the present invention relates to an apparatus for maintaining a vehicle fluid, such as power steering fluid or engine lubricating oil, at a desired temperature. As representative of the present invention, FIG. 1 illustrates schematically a fluid cooling system 10 for controlling the temperature of power steering fluid of a vehicle 12.

The vehicle 12 includes an engine indicated schematically at 14. The vehicle 12 also includes a cooling system 16 for the engine 14. The engine cooling system 16 includes a water pump 18 which circulates liquid engine coolant (not shown) through the engine 14. The engine coolant absorbs heat from the engine 14 as the engine coolant flows through the engine.

The engine coolant flows from the engine 14 to a radiator 20. The radiator 20 is a liquid to air heat exchanger, and the engine coolant is cooled as it flows through the radiator. The engine coolant is recirculated to the water pump 18.

Intermediate the engine 14 and the radiator 20, the engine coolant flows through a coolant de-gas bottle 30. The coolant de-gas bottle 30 is made from molded plastic and has a plurality of walls which define a closed chamber 32 in the bottle.

A coolant inlet 34 extends through a first wall 36 of the bottle 30. Pressurized engine coolant flows through a conduit 38 and through the inlet 34 into the chamber 32 in the de-gas bottle 30. A coolant outlet 40 extends through a second wall 42 of the de-gas bottle 30. Coolant flows out of the chamber 32 through the outlet 40 and thence through a conduit 44 to the radiator 20. The inlet 34 and the outlet 40, together with the walls of the de-gas bottle 30, define an engine coolant passage 50 in the de-gas bottle.

Intermediate the coolant inlet 34 and the coolant outlet 40, the coolant flowing through the engine-coolant passage 50 forms a pool or body of liquid coolant 52 in the chamber 32 in the de-gas bottle 30. The engine cooling system maintains the body of liquid coolant 52 at a fairly stable temperature, typically in the range of from about 220 degrees F. to about 235 degrees F.

The body of liquid coolant 52 preferably has an upper surface 54 spaced below a top wall 56 of the de-gas bottle 30. An air chamber 58 is located above the upper surface 54 of the body of liquid coolant 52. The presence of the air chamber 58 enables any gaseous content of the liquid coolant 52, such as air which may be entrained in the coolant, to escape from the coolant, as is desired.

The vehicle 12 also includes a fluid power assist steering system illustrated schematically at 70. The power steering system 70 includes a pump 72 which circulates power steering fluid to a control valve 74. The control valve 74, in response to movement of the vehicle steering wheel (not shown), directs fluid under pressure to a power assist steering gear 76 of the vehicle 12. The steering gear 76 includes a piston-cylinder assembly (or other type of fluid motor), and a rack and pinion gearset (or other type of gearset). The pressurized fluid effects movement of the piston which results, in a known manner, in movement of the rack and pinion gearset and steering movement of the steerable wheels of the vehicle 12. Low pressure fluid is directed from the control valve 74 to a sump 78 of the steering system 70.

The temperature of the power steering fluid is maintained at an acceptable level by passing the power steering fluid through the coolant de-gas bottle 30. Specifically, a cooler tube 80 is located in the chamber 32 in the de-gas bottle 30. The cooler tube 80 is immersed or disposed within the body of liquid coolant 52 in the chamber 32 in the de-gas bottle 30. The cooler tube 80 defines a passage 82 in the de-gas bottle 30 for enabling flow of power steering fluid through the de-gas bottle.

The cooler tube 80 is preferably a metal tube having cooling fins. The configuration of the cooler tube 80 is selected to maximize the surface area of the cooler tube exposed to the body of liquid engine coolant 52. This may be done by, for example, increasing the length of steering fluid conduit within the de-gas bottle 30, or by changing its cross-sectional configuration, or both. Alternative configurations could include, for example, a helical or spiral coiled tube, or a device having multiple plate-like or planar surfaces.

An inlet conduit 84 is connected to one end 86 of the cooler tube 80. Power steering fluid from the control valve 74 flows into the cooler tube 80 through the inlet conduit 84. An outlet conduit 88 is connected to the other end 90 of the cooler tube 80. Power steering fluid flows out of the cooler tube 80 through the outlet conduit 88 and to the sump 78.

The cooler tube 80 acts as a liquid to liquid heat exchanger between the power steering fluid and the engine coolant. The temperature of the power steering fluid flowing through the cooler tube 80 is adjusted toward the temperature of the coolant surrounding the cooler tube. Specifically, if the temperature of the engine coolant 52 in the chamber 32 is lower than the temperature of the power steering fluid flowing through the cooler tube 80, then the power steering fluid is cooled as it flows through the cooler tube. If the temperature of the engine coolant 52 in the chamber 32 is higher than the temperature of the power steering fluid flowing through the cooler tube 80, then the power steering fluid is warmed as it flows through the cooler tube.

The temperature of the body of engine coolant 52 in the chamber 32 is typically in the range of from about 220 degrees F. to about 235 degrees F. As a result, the temperature of the power steering fluid flowing through the cooler tube 80 tends to be adjusted in a direction toward that same temperature range. Maintaining the power steering fluid in this temperature range promotes effectiveness and long life of the power steering fluid.

Figure 3:
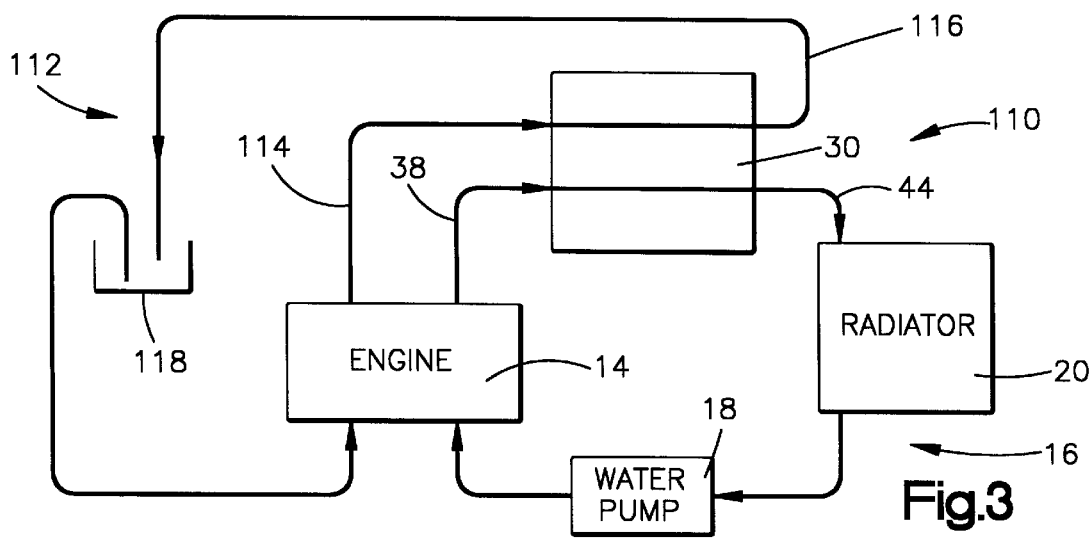
FIG. 3 is a schematic block diagram of a fluid cooling system in accordance with a second embodiment of the present invention, for cooling engine lubricating oil of a vehicle.

FIG. 3 illustrates schematically a fluid cooling system 110 for controlling the temperature of engine lubricating oil of the vehicle 12. In the embodiment of FIG. 3, engine lubricating oil, rather than power steering fluid, is passed through the cooler tube 80 in the coolant de-gas bottle 30. The engine 14 has a lubricating system 112 which includes a conduit 114 for conducting engine oil from the engine 14 to the coolant de-gas bottle 30. Another conduit 116 conducts engine oil from the coolant de-gas bottle 30 to a sump 118.

Engine lubricating oil flows through the cooler tube 80 in the de-gas bottle 30 between the conduits 114 and 116. The cooler tube 80 is immersed in the body of liquid engine coolant 52 in the chamber 32. The cooler tube 80 thus acts as a liquid to liquid heat exchanger between the engine lubricating oil and the engine coolant. The temperature of the engine oil flowing through the cooler tube 80 tends to change toward the temperature of the body of liquid coolant 52 surrounding the cooler tube. Maintaining the engine lubricating oil at the temperature range of the body of engine coolant 52 in the chamber 32 promotes effectiveness and long life of the engine lubricating oil.

From the above description of the invention, those skilled in the art will perceive improvements, changes and modifications in the invention. Such improvements, changes and modifications within the skill of the art are intended to be covered by the appended claims.

Having described the invention, I claim:

1. An engine coolant de-gas bottle for use in an engine cooling system of a vehicle using liquid engine coolant, the vehicle also having a second fluid system such as a fluid power assist steering system or an engine lubricating oil system, said engine coolant de-gas bottle comprising:
    wall means for maintaining a body of liquid engine coolant in said de-gas bottle; and
    means for defining a second fluid passage in said de-gas bottle for enabling flow of the second fluid through said de-gas bottle in a heat-exchanging relationship with said body of liquid engine coolant in said de-gas bottle.

2. A de-gas bottle as set forth in claim 1 wherein said second fluid system is a fluid power assist steering system and said second fluid is power steering fluid.

3. A de-gas bottle as set forth in claim 1 wherein said second fluid system is an engine lubricating oil system and said second fluid is engine lubricating oil.

4. A de-gas bottle as set forth in claim 1 wherein said wall means comprises a plurality of plastic walls which define a closed chamber in the bottle, and including means for defining an engine coolant passage in said de-gas bottle.

5. A de-gas bottle as set forth in claim 1 wherein said body of liquid engine coolant has an upper surface spaced below a top wall of said bottle and said second fluid passage is located below said upper surface.

6. A de-gas bottle as set forth in claim 1 wherein said means for defining a second fluid passage comprises a cooler tube disposed within said body of liquid coolant in said chamber in said bottle for enabling flow of the second fluid through said de-gas bottle.

7. A de-gas bottle as set forth in claim 6 wherein said cooler tube is a finned metal tube through which power steering fluid flows.

8. A fluid power assist steering system for a vehicle having an engine and an engine cooling system which includes a coolant de-gas bottle through which liquid engine coolant flows, said steering system comprising:
    a steering gear assembly operative in response to fluid pressure to effect steering movement of steerable wheels of the vehicle;
    supply means for providing steering fluid under pressure to said steering gear assembly; and
    a plurality of steering fluid conduits connected with said steering gear assembly and said supply means;
    one of said steering fluid conduits extending through the coolant de-gas bottle in a heat-exchanging relationship with engine coolant in the coolant de-gas bottle.

9. A steering system as set forth in claim 8 wherein said coolant de-gas bottle comprises walls defining a chamber in said coolant de-gas bottle, a coolant inlet extending through one wall and a coolant outlet extending through another wall, the engine cooling system including a body of liquid coolant in said chamber, said one steering fluid conduit extending through the body of liquid coolant in said chamber.

10. A steering system as set forth in claim 9 wherein said one steering fluid conduit extending through the body of liquid coolant in said chamber comprises a finned metal tube.

* * * * *